United States Patent [19]

Graefe

[11] Patent Number: 5,782,398
[45] Date of Patent: Jul. 21, 1998

[54] DEVICE FOR INSIDE SCARFING OF LONGITUDINALLY WELDED TUBES OR PROFILES

[76] Inventor: Michael Graefe, Hamerweg 315, D-41068 Mönchengladbach, Germany

[21] Appl. No.: 703,456

[22] Filed: Aug. 27, 1996

[30] Foreign Application Priority Data

Aug. 28, 1995 [DE] Germany .................. 195 32 835.3

[51] Int. Cl.⁶ .................................................. B23K 37/00
[52] U.S. Cl. .................. 228/17.5; 228/125; 228/147; 409/299
[58] Field of Search .................. 228/125, 147, 228/13, 17.5, 19; 409/299

[56] References Cited

U.S. PATENT DOCUMENTS

| | | | |
|---|---|---|---|
| 4,600,180 | 7/1986 | Abbey, III .................. | 266/51 |
| 5,056,972 | 10/1991 | Burwell et al. .................. | 409/299 |
| 5,318,389 | 6/1994 | Strong et al. .................. | 408/204 |
| 5,411,198 | 5/1995 | Jansto .................. | 228/125 |

*Primary Examiner*—Samuel M. Heinrich
*Attorney, Agent, or Firm*—Mason, Kolehmainen, Rathburn & Wyss

[57] ABSTRACT

A device for the inside scarfing of tubes or profiles longitudinally welded in a tube welding line consists of a tool carrier guided on guide rollers inside the tube to which a cutting ring is attached. The cutting ring is clamped in a cutting ring holder and can be rotated about its central axis which is inclined at an acute angle to the longitudinal axis of the tube. The cutting ring can be retracted from the cut, whereby at the same time as the retraction of the cutting ring, the clamp can be released and the cutting ring can be turned further by a defined angle. The device is controlled by at least one hydraulic or electric line leading out from the welding point of the tube or profile in the tube welding line.

10 Claims, 1 Drawing Sheet

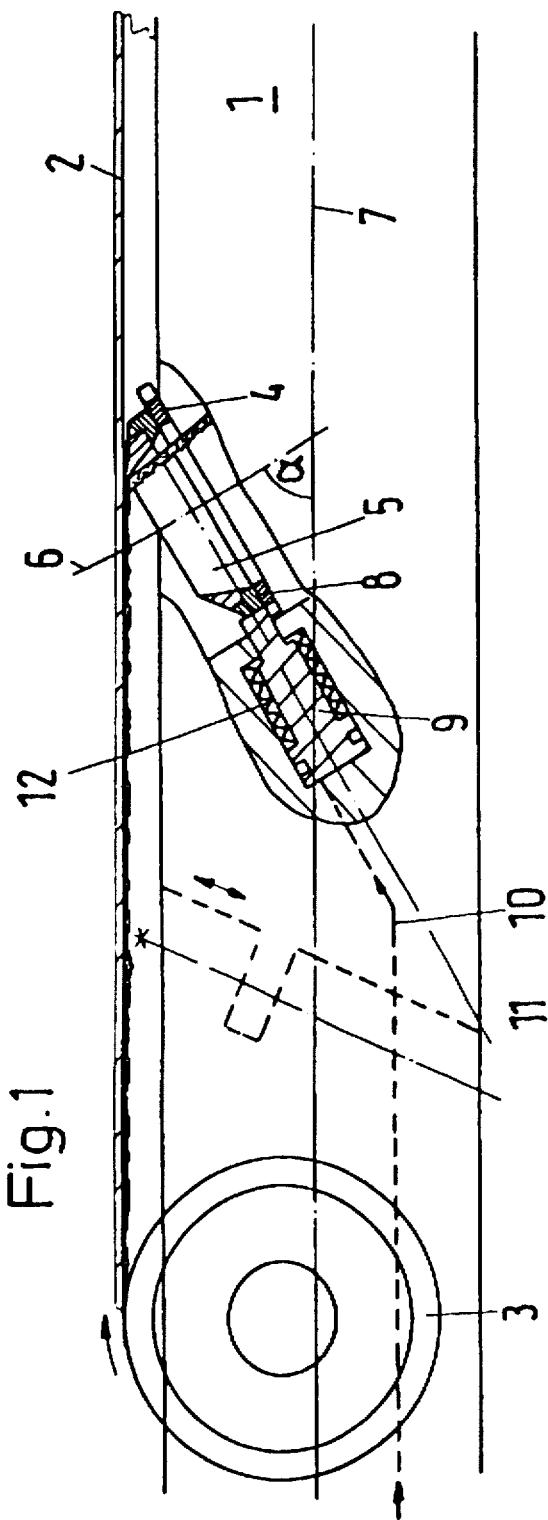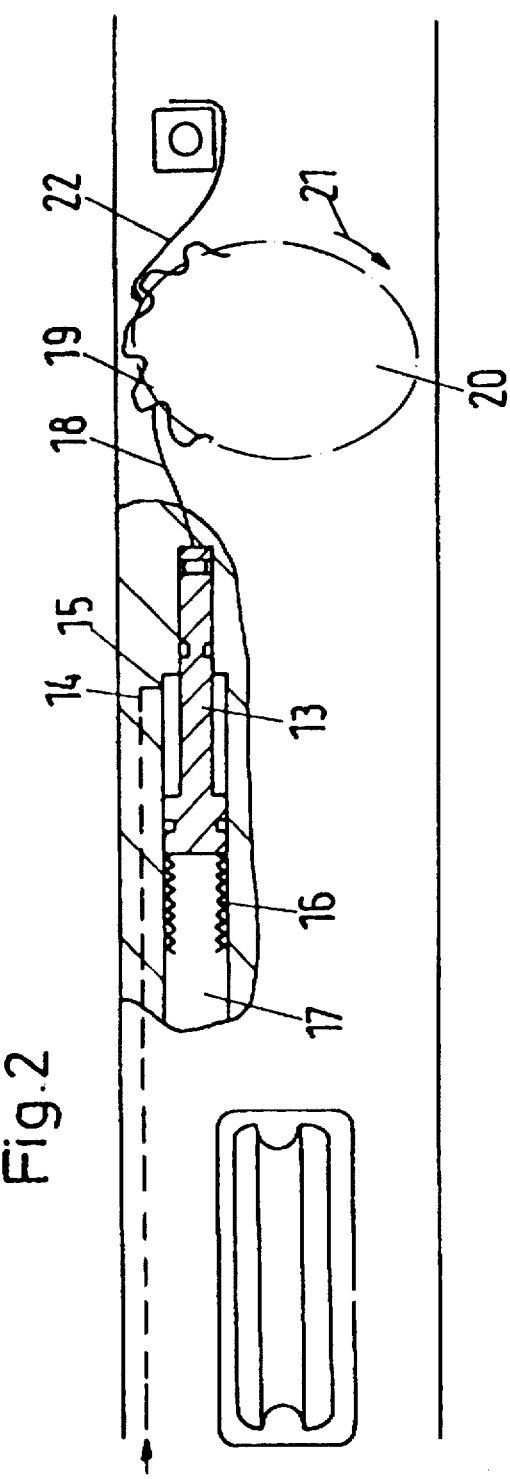

DEVICE FOR INSIDE SCARFING OF LONGITUDINALLY WELDED TUBES OR PROFILES

BACKGROUND OF THE INVENTION

1. Field of the Invention

The invention relates to a device for inside scarfing of tubes or profiles longitudinally welded in a tube welding line. The device consists of a tool carrier guided on guide rollers inside the tube to which a cutting ring is attached. The cutting ring is clamped in a cutting ring holder and can be rotated about its central axis which is inclined at an acute angle to the longitudinal axis of the tube.

2. Background of the Invention

Such a device is known, for example, from DE 33 47 146 C1. Such devices are used to remove the inner weld bead produced on both the inner and outer surface of longitudinally welded tubes by the upset, almost liquid material of the strip edges pressed together at the welding point. This weld bead is scraped off behind the welding point on the inner and outer sides of the tube by scarfing tools, whereby the outside scarfing generally presents no problems because access to the outer weld bead is easy.

Removal of the inner weld bead, on the other hand, necessitates special measures. The cutting tools are of particular importance here as they are subject to very high loads and wear correspondingly quickly. For removing the inner weld bead it has been proposed to constantly rotate a dislike chisel driven by a cutting force component (DE-OS 21 03 400). Despite the longer service life of such tools, only a poor cutting quality is achieved with this device.

The employment of cutting rings of metal carbide which are used at various points on their circumference for inside scarfing is also known. For this, the cutting ring is clamped in the cutting ring holder so that it can rotate about its central axis. A screw which contacts the cutting ring tangentially is used to clamp the ring. When turning the cutting ring, the tube welding line is stopped, an opening is made in the welded tube, the clamp is released through this opening and then the cutting ring is turned further by hand. This results in long standstill times and thus high costs. The tube section with the opening has to be scrapped.

JP Appl No. 6282 349 describes the proposal to adjust the tool carrier and the attached cutting ring from outside the tube via rods, whereby separate rods are provided for various functions (e.g. adjustment of the cutting depth, adjustment of the contact force, turning of the cutting ring), some of which can be rotated and some of which can move back and forth. The actuation of these rods presents considerable problems as the rods and bevel gear sets and connected levers for rotating these rods have to fit into the space available inside the tube As the cross-section of the produced tube in the area of the welding point is generally more or less filled by an impeder with ferrite rods, it is particularly difficult to pass the rods through this area. For this reason it has proven impracticable to actuate the tool carrier and attached cutting ring mechanically via individual rods from outside the tube.

The task on which the invention is based consists in creating a device such as that described at the beginning which can be actuated from outside the tube, is of simple design, operates reliably, requires only short standstill times and takes up the smallest possible cross-section in the area of the welding point.

This task is solved in that the cutting ring, controlled by at least one hydraulic or electric line leading out from the welding point of the tube or profile, is moved out of the cut and at the same time the clamp of the cutting ring is released and the cutting ring is turned by a defined angle such that at the next cut, the cutting ring sector adjacent to the cutting ring sector previously In use is automatically brought into cutting position.

Since, as is generally known, the strips employed are not endless but are made practically infinitely long by welding together finite strip lengths, strip cross welds pass the inside scarfer at regular intervals. In order to avoid damaging the cutting ring of the inside scarfer, the invention proposes that during the passage of the cross weld (as is the normal procedure), the cutting ring is retracted from the cut and at the same time as the cutting ring moves back, a release of the cutting ring clamp and a turning of the cutting ring by a defined angle is triggered. The standstill times of the tube welding line are significantly reduced because due to the automatic turning of the cutting ring when the cutting ring is taken out of the cut to allow a cross weld to pass, another sector of the cutting ring circumference is used for the next cut. The same occurs at a welding line stop: At the same time as the cutting ring is retracted, it is again turned by a defined angle. A particular advantage is that the cross-sectional area required for the hydraulic or electric lines is significantly smaller than for actuating rods. A further benefit is that electric or hydraulic lines can be easily guided out of the tube.

SUMMARY OF THE INVENTION

A favourable design of the invention proposes that the cutting ring is surrounded coaxially by an externally splined toothed ring and can be clamped in the tool carrier by a clamping plunger and can be turned further by the defined angle by a feed plunger engaging in the splines of the toothed ring. As a result, the clamping of the cutting ring can be released by pressure medium and controlled from outside the tube by releasing the clamping plunger and at the same time the cutting ring holder together with the cutting ring can be turned one step further by a feed plunger which engages in the toothed ring.

In order to prevent the cutting ring turned forward by the feed plunger turning back in the opposite direction when the feed plunger is returned to its starting position, a further feature of the invention provides for a detent pawl which engages in the toothed ring to prevent the cutting ring turning in one direction.

The clamping plunger and feed plunger can be single-acting, whilst for the retraction movement of the clamping plunger and the feed movement of the feed plunger, springs are provided which produce the required movements. It is intended that the pressure medium lines of clamping plunger and feed plunger should be linked and connected to a common pressure medium source. Appropriate circuiting of clamping plunger and feed plunger will allow their movements to be controlled together by opening and dosing the common pressure medium line so that with the retraction of the clamping plunger, a release of the cutting ring and simultaneous extension of the feed plunger to turn the cutting ring can be carried out In an alternative it is also feasible, however, to use a double-acting clamping plunger and feed plunger (e.g. return stroke with cooling emulsion at approx. 10 bar).

A hydraulic medium can be used as pressure medium, preferably the emulsion concentrate already being used in the tube welding line. In this case, minor leakages would not cause problems.

In a further development it is intended that at least the spaces in the tool carrier for the springs and the toothed ring should be flooded with cooling emulsion. This would ensure that no scale particles enter the spaces which could hamper the mechanical function of the plungers and springs.

BRIEF DESCRIPTION OF THE DRAWING

One example of the invention is shown in the drawing and is described below.

FIG. 1 shows the tool carrier of a device for inside scarfing in the longitudinal section, and FIG. 2 shows the tool carrier from FIG. 1 in longitudinal sectional turned through 90 degrees.

DETAILED DESCRIPTION OF THE PREFERRED EMBODIMENT

In FIG. 1, 1 is the tool carrier of a device for inside scarfing of longitudinally welded tubes and profiles which is guided with a guide roller 3 along the inner wall 2 of a longitudinally welded tube. The tool carrier 1 holds a cutting ring 5 in a cutting ring holder 4. The central axis 6 of the cutting ring 5 is inclined at an acute angle α to the longitudinal axis 7 of the tube. Linked coaxially to the central axis 6 of the cutting ring 5 is an externally splined toothed ring 8 with a cutting ring holder 4 whose function will be described later. As shown in the upper half of the drawing, the cutting ring 5 is clamped in the cutting ring holder 6 by a clamping plunger 9 whose pressure medium chamber—pressurised with pressure medium via the pressure medium line 10—causes clamping plunger 9 to extend towards cutting ring holder 4. The return movement of clamping plunger 9 is effected by a spring 12 located coaxially to its axis 11. This spring 12 acts against the plunger surface of the clamping plunger 9.

As shown in the lower half of the drawing, a further plunger/cylinder unit is located in tool carrier 1 as a feed plunger 13. The feed plunger 13 can be pressurised on one side with pressure medium via the pressure medium line 14 at 15 so that the feed plunger 13 is moved against the effect of the spring 16 in its plunger chamber (in the drawing to the left) when the pressure medium line 14 is pressurised with pressure medium. The feed plunger 13 is moved by the pressure medium to one end position and is held there.

Attached to the feed plunger 13 at the free end of the feed plunger 13 protruding from the cylinder chamber 17 is a leaf spring 18 whose free end engages in the teeth 19 of toothed ring 20 as soon as the pressure medium line 14 to the plunger chamber of feed plunger 13 is relieved. Then the spring 16 causes a movement of the feed plunger 13 (in the drawing plane to the right), whereby the end of the leaf spring is pressed into tooth 19 of the toothed ring 20 and when the feed plunger 13 continues to move causes the toothed ring 20 to turn in the direction of the arrow 21.

A detent pawl is shown schematically at 22 which engages been two teeth 19 of the toothed ring 20 and prevents the toothed ring 20 turning back when the feed plunger 13 is moved back together with the leaf spring 18 by pressurising the feed plunger 13 via the pressure medium line 14.

When pressure medium lines 10 and 14 are linked, a relief of the pressure media pressure in the supply lines causes the clamping effect of clamping plunger 9 to be relieved and causes the clamping plunger 9 to be moved back under the pressure of the spring 12 and at the same time a movement of the feed plunger 13 with the leaf spring 18 towards the toothed ring 20 under the pressure of the spring 16. A pressurisation of the pressure medium lines with pressure medium clamps on the one hand the cutting ring 5 in its working position via clamping plunger 9 and at the same time ends the turning movement of the toothed ring 20 by retracting the feed plunger 13.

The spaces around and alongside the clamping and feed plungers 9, 13 and the space in which the toothed ring 20 is located can be filled with emulsion which is inside the tube anyway for cooling and lubrication of the cutting ring 5.

The invention permits an automatic turning of the cutting ring 5 whenever it is retracted during the passage of a cross-weld or during a welding line stop so that a functionally reliable device for inside scarfing of longitudinally welded tubes and profiles is created with very simple means.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the United States is:

1. A device for inside scarfing of a tube longitudinally welded in a tube welding line, comprising:

a tool carrier having a cutting ring holder and being guided on guide rollers inside said tube;

a cutting ring having cutting ring sectors adapted to be in cutting position and being clamped to said cutting ring holder by a clamp means, said cutting ring holder be rotatable about its central axis which is inclined at an acute angle with respect to the longitudinal axis of said tube; and control means for controlling said cutting ring remotely from the welding point of the tube so that when said cutting ring is moved from said cutting position, said clamp means releases said cutting ring and said cutting ring is turned by a defined angle such that another of said cutting ring sectors adjacent to the cutting ring sector previously used is automatically brought into said cutting position.

2. A device in accordance with claim 1, wherein said cutting ring is surrounded coaxially by an externally splined toothed ring having a plurality of splines and wherein said clamp means includes a clamping plunger and wherein said cutting ring can be turned further by the defined angle by a feed plunger engaging in the splines of the toothed ring.

3. A device in accordance with claim 2, wherein said clamping plunger and the feed plunger are single-acting and including spring means in connection with the movement of said clamping plunger and said feed plunger.

4. A device in accordance with claim 3, including pressure medium lines coupled to said clamping plunger and said feed plunger, said pressure medium lines being connected to a common medium source.

5. A device in accordance with claim 2, wherein the clamping plunger and the feed plunger are double-acting.

6. A device in accordance with claim 2, wherein the toothed ring is designed as a worm gear and is driven via a worm shaft by a motor located in the tool carrier.

7. A device in accordance with claim 1, including a detent pawl engaging in the toothed ring to limit movement of the cutting ring to one direction.

8. A device in accordance with claim 7, including a hydraulic medium used as a pressure medium.

9. A device in accordance with claim 8, wherein pressure medium is selected from the group consisting of hydraulic oil, cooling emulsion, emulsion concentrate and grease.

10. A device in accordance with claim 1, wherein all of the spaces for moving parts of the tool carrier are flooded with an emulsion during operation of said device to prevent faults caused by scale.

* * * * *